US006782717B2

United States Patent
Saito et al.

(10) Patent No.: US 6,782,717 B2
(45) Date of Patent: Aug. 31, 2004

(54) METHOD FOR MANUFACTURING GLASS SUBSTRATE OF INFORMATION RECORDING MEDIUM

(75) Inventors: Yasuhiro Saito, Osaka (JP); Kazuishi Mitani, Osaka (JP); Tatsuro Umeyama, Osaka (JP); Koji Okuhata, Osaka (JP); Toshiaki Hashimoto, Osaka (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/346,202

(22) Filed: Jan. 16, 2003

(65) Prior Publication Data

US 2003/0170417 A1 Sep. 11, 2003

(30) Foreign Application Priority Data

Jan. 18, 2002 (JP) ......................................... 2002-010671

(51) Int. Cl.[7] ........................... C03B 21/00; C03B 19/00
(52) U.S. Cl. ............................. 65/30.14; 65/31; 65/61; 451/41; 451/63; 451/296; 451/307
(58) Field of Search ........................... 65/30.14, 31, 61; 428/64.2–65.7; 451/41, 63, 296, 307

(56) References Cited

U.S. PATENT DOCUMENTS

| 4,833,001 | A  | * | 5/1989 | Kijima et al. ............... 428/141 |
| 5,645,471 | A  | * | 7/1997 | Strecker ...................... 451/59 |
| 5,871,654 | A  | * | 2/1999 | Mannami et al. .............. 216/22 |
| 6,290,573 | B1 | * | 9/2001 | Suzuki .......................... 451/8 |
| 6,383,404 | B1 | * | 5/2002 | Sakai et al. ................... 216/97 |
| 6,547,980 | B1 | * | 4/2003 | Kurachi et al. ............... 216/97 |
| 6,576,353 | B1 | * | 6/2003 | Mitani et al. ......... 428/694 SG |

* cited by examiner

*Primary Examiner*—Sean Vincent
(74) *Attorney, Agent, or Firm*—Fish & Richardson P.C.

(57) ABSTRACT

A method for manufacturing a disk-like glass substrate that is used as an information recording medium. The glass substrate is acid resistant. When an index of acid resistance is the maximum depth at which components other than silica dissolve from the glass substrate during immersion of the glass substrate in 1 percentage of weight of sulfuric acid, the acid resistance of the glass substrate is represented by the maximum depth of 0.5 nm to 10 nm. A linear texture is formed by pressing a tape against the glass substrate in a circumferential direction of the glass substrate while feeding abrasion slurry to the surface of the glass substrate. Acid treatment is performed on the glass substrate on which the texture is formed.

8 Claims, 3 Drawing Sheets

Making Disks ~11
Chamfering ~12
Polishing ~13
Chemically Reinforcing ~14
Making Texture ~15
Acid Treatment ~16
Alkali Treatment ~17

METHOD FOR MANUFACTURING GLASS SUBSTRATE OF INFORMATION RECORDING MEDIUM

CROSS REFERENCE TO RELATED APPLICATIONS

Pursuant to 35 USC § 119, this application claims the benefit of Japan Patent Application No. 2002-010671 filed Jan. 18, 2002.

BACKGROUND OF THE INVENTION

The present invention relates to a method for manufacturing a glass substrate of an information recording medium, such as a magnetic disk, a magneto-optic disc, or an optical disc. More specifically, the present invention relates to a method for manufacturing a glass substrate of an information recording medium that enables sufficient removal of abrasion material and glass chips without deforming the texture of the glass substrate surface and enables stable operation of a reading device.

In the prior art, a glass substrate of an information recording medium is immersed in a chemical reinforcement liquid, which is contained in a tank, to chemically reinforce the surface of the glass substrate. Thermally molten potassium nitrate ($KNO_3$) is used as the chemical reinforcement liquid. Lithium ions ($Li^+$) or sodium ions (Na+), which exist near the surface of the glass substrate, are exchanged with potassium ions ($K^+$), the ion radius of which is greater than that of the lithium ions and the sodium ions. This forms a compression stress layer on the surface of the glass substrate and reinforces the glass substrate.

Subsequently, an abrasion tape is pressed against the surface of the glass substrate in the circumferential direction while feeding abrasion slurry, which includes diamonds, to the surface. This forms a linear texture that extends in the circumferential direction of the glass substrate.

After forming the texture, the glass substrate is washed by immersing the substrate in water or an alkali solution or by scrubbing the substrate as water or an alkali solution runs along the substrate.

Subsequent to the texture formation, glass chips and the abrasion material of the abrasion slurry remain on the surface of the glass substrate. Thus, the glass chips and abrasion material must be washed away and removed.

The linear texture, which extends in the circumferential direction of the glass substrate, is formed from fine embossments. Thus, the shape of the embossments may change when performing a physical or chemical process. The texture is not uniform. Thus, the texture may deform especially at portions that are narrow during the washing process. This would hinder the removal of abrasion material and glass chips subsequent to the texture formation. When using the glass substrate for a magnetic recording medium or the like, this may decrease the stability of a magnetic head, which reads magnetic data from the surface of the glass substrate. Further, the magnetic head may be lifted above the proper position. This may decrease the reading accuracy and damage the magnetic head.

SUMMARY OF THE INVENTION

Accordingly, it is an object of the present invention to provide a method for manufacturing a glass substrate of an information recording medium that enables stable operation of a reading device and sufficient removal of abrasion material and glass chips without deforming the texture of the glass substrate surface.

To achieve the above object, the present invention provides a method for manufacturing a glass substrate that is used as an information recording medium. The method includes preparing a disk-like glass substrate. The glass substrate is acid resistant. When an index of acid resistance is the maximum depth at which components other than silica dissolve from the glass substrate during immersion of the glass substrate in 1 percentage of weight of sulfuric acid, the acid resistance of the glass substrate is represented by the maximum depth of 0.5 nm to 10 nm. The method further includes forming a linear texture by pressing a tape against the glass substrate in a circumferential direction of the glass substrate while feeding abrasion slurry to the surface of the glass substrate, and performing acid treatment on the glass substrate on which the texture is formed.

A further aspect of the present invention is a disk-like glass substrate that is used as an information recording medium. The glass substrate includes a linear texture formed on a surface of the glass substrate. The glass substrate is acid resistant. When an index of acid resistance is the maximum depth at which components other than silica dissolve from the glass substrate during immersion of the glass substrate in 1 percentage of weight of sulfuric acid, the acid resistance of the glass substrate is represented by the maximum depth of 0.5 nm to 10 nm.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(*b*) is a schematic view showing the shape of the texture subsequent to acid treatment.

DETAILED DESCRIPTION OF THE PREFERRED EMBODIMENTS

A preferred embodiment of the present invention will now be discussed with reference to the drawings.

Figure 1:
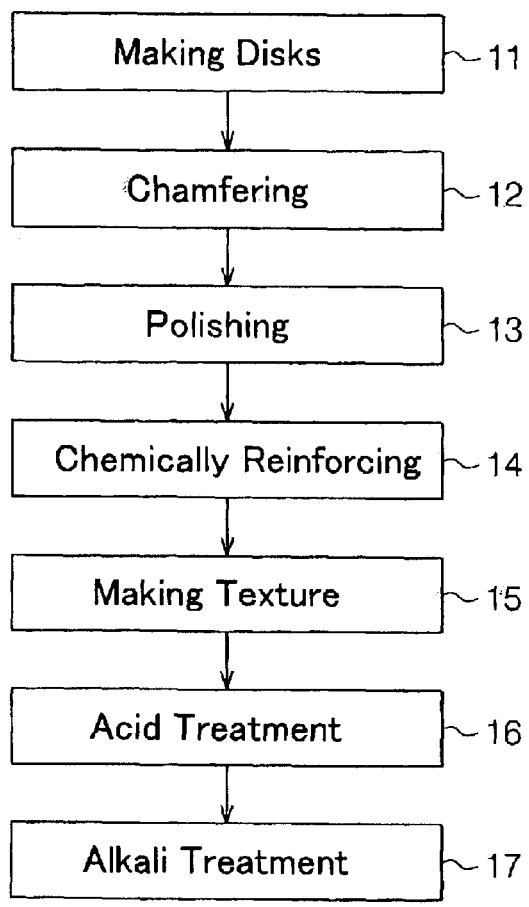
FIG. 1 is a chart illustrating the procedure for manufacturing an information recording medium glass substrate according to a preferred embodiment of the present invention.

An information recording medium glass substrate according to a preferred embodiment to the present invention is disk-like and has a round hole extending through its center. The glass substrate is used as the substrate of an information recording medium, such as a magnetic disk, a magneto-optic disc, or an optical disc. FIG. 1 is a chart illustrating the procedure for manufacturing a glass substrate of the magnetic disk. As shown in FIG. 1, the glass substrate is manufactured by undergoing a disk machining process 11, an inner and outer circumferential surface chamfering process 12, a surface polishing process 13, a chemical reinforcement process 14, a texture formation process 15, an acid treatment process 16, and an alkali treatment process 17. Surface 20 refers to the surface in which information is recorded when using the glass substrate 18 as an information recording medium.

Soda-lime glass, the main components of which are silicon dioxide ($SiO_2$), sodium oxide ($NaO_2$), and calcium oxide (CaO); aluminosilicate glass, the main components of which are $SiO_2$, aluminum oxide ($Al_2O_3$), $R_2O$ (R represents potassium (K), sodium (Na), or lithium (Li)); borosilicate glass; lithium oxide ($Li_2O$)—$SiO_2$ glass; $Li_2$—$Al_2O_3$—$SiO_2$ glass; or R'O—$Al_2O_3$—$SiO_2$ glass (R' represents magnesium (Mg), calcium (Ca), strontium (Sr), or barium (Ba)) may be used as the glass material (glass sheet) that forms the glass substrate 18. Any one of these materials may be used as long as zirconium oxide ($ZrO_2$), titanium oxide ($TiO_2$), or the like is added to the material to form chemical reinforcement glass. The outer diameter of the glass substrate 18 is, for example, 89 mm (3.5 inches), 76 mm (3.0 inches), or 64 mm (2.5 inches), and the thickness of the glass substrate 18 is, for example, 0.63 mm.

The maximum depth from which components other than silica are dissolved when immersing the glass in one percentage by weight of sulfuric acid at 50° C. for one minute defines the acid resistance of the glass substrate 18. The acid resistance of the glass substrate 18 corresponds to a maximum depth of 0.5 to 10 nanometers (nm), preferably 1 to 4 nm. If the maximum depth that corresponds to the acid resistance were less than 0.5 nm, the etching effect of acid would be insufficient. Further, the abrasion material and glass chips of the texture formation process would not be removed properly and the desired texture would not be obtained. If the maximum depth corresponding to the acid resistance were greater than 10 nm, the amount etched by acid would be excessive. This would deform the texture in an improper manner.

Figure 2:
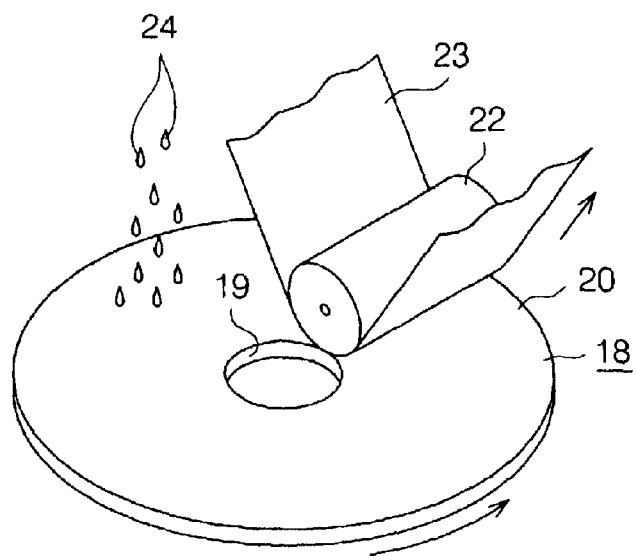
FIG. 2 is a perspective view showing an apparatus for forming a texture on the surface of the glass substrate.
Figure 3:
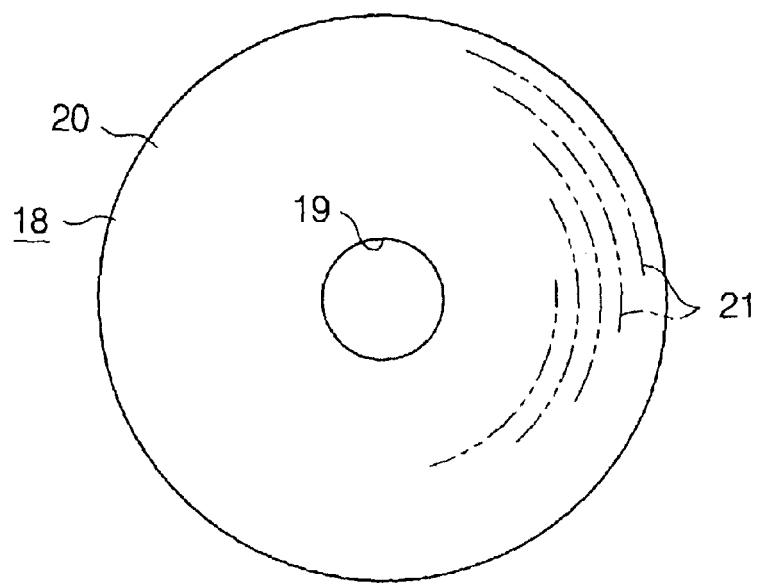
FIG. 3 is a plan view showing the surface of the glass substrate subsequent to the formation of the texture.

In the disk machining process. 11, the sheet-like glass substrate 18 is cut with a cutter, which is made of hard metal or diamond, to form a disk having a round hole 19 in its center, as shown in FIG. 2 or 3. In this state, the outer and inner circumference of the disk may be cut simultaneously. Alternatively, the inner circumference may be cut after the outer circumference.

In the chamfering process 12, the outer and inner circumferences of the glass substrate 18 are polished so that the glass substrate 18 obtains the predetermined outer and inner diameters. Further, the surface edges of the inner and outer circumferences are polished and chamfered. A grindstone, to which diamond abrasion grains are adhered, is used in the chamfering process 12.

The chamfering of the glass substrate 18 may be performed in two stages using rough diamond abrasion grains and fine diamond abrasion grains, such as #325 and #500 (or #600). If the inner and outer diameters are already close to the desired values, chamfering may be performed in only one stage. The inner and outer circumferential surfaces of the chamfered glass substrate 18 are polished with abrasion material to obtain a finer surface, or decrease the surface roughness.

It is preferred that the polishing amount (removal depth) be 5 to 20 $\mu$m. When the polishing amount is less than 5 $\mu$m, the surface roughness of the inner and outer circumferential surfaces cannot be lower to the desired value. Further, it is difficult to further lower the surface roughness when the polishing amount exceeds 20 $\mu$m. Rare earth metal oxides, such as cerium oxide or lanthanum oxide; zirconium oxide; manganese dioxide; aluminum oxide; and colloidal silica may be given as specific examples of the abrasion material. Among these materials, rare earth oxides, especially, cerium oxide, is preferred due to its superior polishing efficiency.

In the surface polishing process 13, the glass substrate 18, the inner and outer circumferential surfaces of which have been chamfered, undergoes lap polishing and smooth polishing to polish the glass substrate surface 20. Lap polishing is performed so that the glass substrate 18 obtains the predetermined thickness and so that the surface 20 is evened to increase the flatness of the surface 20. Further, lap polishing is performed to remove significant deficiencies, such as pits or cracks, and obtain a finer surface. Lap polishing may be omitted to reduce costs as long as the bent amount or undulated amount of the glass is within a tolerable range when the glass is formed.

Smooth polishing is performed to obtain the flatness and smoothness that is required when using the glass substrate as an information recording medium. Although the abrasion material that is to be used is not restricted, it is preferred that cerium oxide abrasion material, which has a superior polishing property with respect to glass, be used. Further, although not restricted, it is preferred that the grain diameter of the abrasion material be 0.1 $\mu$m to 3 $\mu$m to obtain the desired flatness at the desired polishing speed. The polishing method is also not restricted. However, a double surface polishing machine having artificial suede pads applied to upper and lower surface plates may be employed to polish both sides of a glass substrate to perform polishing inexpensively and accurately. Further, polishing may be performed in two stages to obtain the desired flatness at the desired polishing speed.

It is preferred that the glass substrate 18 be washed after the surface polishing process 13 to remove abrasion grains from the surface of the glass substrate 18.

In the following chemical reinforcement process 14, the glass substrate 18, which has been polished, undergoes chemical reinforcement to improve properties, such as impact resistance, vibration resistance, and heat resistance, that are required for an information recording medium substrate. Chemical reinforcement refers to the exchange of some of the ions included in the glass substrate, for example, univalent ions, such as lithium ions and sodium ions, with univalent metal ions having a greater ion radius, such as sodium ions and potassium ions. Such ion exchange forms a compression stress layer on the surface of the glass substrate 18 and chemically reinforces the glass substrate 18.

Chemical reinforcement is performed by immersing the glass substrate 18 in a processing liquid, which is obtained by thermally melting salt, for a predetermined time. Specific examples of a chemical reinforcing salt are potassium nitrate ($KNO_3$), sodium nitrate ($NaNO_3$), or silver nitrate. The chemical reinforcing salt may also be a combination of two or more of these materials. It is preferred that the temperature of the processing liquid be about 50° C. to 150° C. below the strain point of the glass substrate. It is further preferred that the temperature of the processing liquid be about 350° C. to 400° C.

If the temperature of the processing liquid were lower than about 150° C. below the strain point of the glass substrate 18, the glass substrate 18 would not be chemically reinforced in a sufficient manner. If the temperature of the processing liquid were greater than 50° C. below the strain point of the glass substrate 18, strain would occur when chemically reinforcing the glass substrate 18.

During the chemical reinforcement, more than one glass substrate 18 is held by a holder, and more than one holder is accommodated in a cage. In this state, the cage is immersed in the chemical reinforcement liquid of a tank.

The ion exchange increases the concentration of the potassium ions ($K^+$) on the surface of the chemically reinforced glass substrate 18. The concentration of potassium ions gradually decreases at deeper positions from the surface of the glass substrate 18. Since the ion exchange decreases the concentration of the lithium ions ($Li^+$), the concentration of the lithium ions is lowest at the surface of the glass substrate 18 and gradually increases at deeper positions from the surface of the glass substrate 18. Further, the concentration of sodium ions ($Na^+$) decreases when ion exchange is performed with the potassium ions and increases when ion exchange is performed with the lithium ions. Thus, the concentration of the sodium ions is low at the surface of the glass substrate 18, increases at deeper positions from the surface of the glass substrate 18, reaches its peak at a certain depth, and decreases at positions that are further deeper.

The thickness of the compression stress layer (chemical reinforcement layer), which is formed through the chemical reinforcement, is preferably 100 $\mu$m to 200 $\mu$m from the surface of the glass substrate 18. If the thickness were less than 100 $\mu$m, the chemical strength of the glass substrate 18 would be insufficient. Thus, the glass substrate 18 would not achieve the performance that is required for an information recording medium substrate. If the thickness were to exceed 200 $\mu$m, it would be necessary to increase the temperature of the processing liquid or immerse the glass substrate 18 in the processing liquid for a longer time. This may lower the manufacturing efficiency of the glass substrate 18.

The necessary strength of the entire glass substrate 18 is obtained by performing the chemical reinforcement smoothly. The ion exchange forms the compression stress layer on the surface of the glass substrate 18 and increases the strength of the glass substrate 18. This prevents the glass substrate 18, if used as an information recording medium, from being damaged when rotated at high speeds.

After the chemical reinforcement is performed, if necessary, the glass substrate 18 is washed with water, alkali solution, or an acid solution and then dried. Afterward, the texture formation process 15 is performed to form a texture 21 on the surface 20 of the glass substrate 20, as shown in FIG. 3. The texture 21 is formed in the circumferential direction of the glass, substrate 18 (circumferential texture). It is preferred that the average roughness Ra of the surface 20 of the glass substrate 18, which undergoes the texture formation process), be 0.1 nm to 1.5 nm, more preferably 0.1 nm to 1.0 nm, and most preferably, 0.1 to 0.6 nm. If the average roughness Ra is less than 0.1 nm or greater than 1.5 nm, it would become difficult to form a fine texture that is optimal for an information recording medium.

The texture formation is performed by dripping diamond slurry on the surface 20 of the glass substrate 18 while applying a tape 23 to the surface 20 of the glass substrate 18. The apparatus for performing the texture formation is not restricted, and a so-called texture machine, which is used to process the texture of an aluminum substrate, may be used.

The structure of the texture formation apparatus will now be discussed with reference to FIG. 2. A roller 22, which extends in the radial direction of the glass substrate 18, is rotatably supported above the disk-like glass substrate 18. The length of the roller 22 is equal to the diameter of the glass substrate 18.

As shown by the arrow in FIG. 2, the texture formation tape 23 is transferred through the space between the glass substrate 18 and the roller 22 from one side of the roller 22 to the other side of the roller 22. When the tape 23 passes through the space between the glass substrate 18 and the roller 22, the roller 22 presses the tape 23 against the surface 20 of the glass substrate 18. A woven fabric, a non-woven fabric, or a bristled product may be used as the material of the tape 23.

The glass substrate 18 is rotated in the direction indicated by the curved arrow of FIG. 2, diamond slurry 24 is dripped onto the glass substrate 18, and the tape 23 is transferred in the direction indicated by the straight arrow in FIG. 2. This forms the texture 21 on the surface 20 of the glass substrate 18.

The material of the tape 23 is not restricted, and any material, such as polyethylene fiber, may be used as long as the texture 21 can be formed.

The grain diameter and shape of the diamond abrasion grains included in the diamond slurry 24 is not restricted and may be selected in accordance with the linear density required for the texture 21. In addition, the crystalline characteristic of the diamond abrasion grains is not restricted, and polycrystalline grains may be used in addition to monocrystalline grains. Further, abrasive grains, such as cerium oxide or manganese oxide, or an alkali agent may be added to the diamonds to increase the polishing capability.

The average diameter ($D_{50}$) of the diamond abrasion grains is preferably 0.09 $\mu$m to 0.3 $\mu$m, and more preferably, 0.15 $\mu$m to 0.25 $\mu$m. If the average grain diameter were less than 0.09 $\mu$m, the capability for forming the texture 21 would decrease. This would decrease the formation speed of the texture 21 and increases the texture formation cost. If the average grain diameter were to exceed 0.3 $\mu$m, this would decrease the number of small ridges, which are spaced from each other by a predetermined distance in the radial direction of the glass substrate 18, per unit length. As a result, the linear density of the texture 21 would be insufficient.

Any type of solvent may be used to disperse the diamond abrasion grains and form the slurry. Further, a surface active agent may be added to the slurry to increase the dispersion of the diamond abrasion grains.

The conditions for forming the texture 21 are determined in accordance with the shape, density, and length of the desired texture 21. The following are two specific examples of the texture forming conditions.

(1) Tension of tape 23: 22.1(N)

Moving speed of tape 23: 7.6(cm/min)

Pressing force of roller 22: 30.9(N)

Rotating speed of glass substrate 18: 300(rpm)

Material of tape 23: polyester

Average grain diameter of diamond abrasion grains: 0.2 ($\mu$m)

Feeding rate of diamond slurry 24: 20(ml/min)

(2) The conditions being the same as example (1) except in that the average grain diameter of the diamond abrasion grains is 0.1($\mu$m).

The linear texture (pits and ridges) 21 is formed in the circumferential direction of the glass substrate 18 by performing texture formation under the above conditions. When forming the texture, the average of the depth that is removed from the glass substrate 18 when forming the texture 21, or the removal depth, is preferably 0.5 nm to 10 nm, and more preferably, 0.5 nm to 4 nm. If the average removal depth were less than 0.5 nm, the texture 21 would become low and it would become difficult to form the texture 21 that is required to increase magnetic holding force. If the average removal depth were to exceed 10 nm, the removed amount of the compression stress layer, the potassium ion concentration of which is high, on the surface of the glass substrate 18 would increase. This would cause easily movable alkali, such as sodium and potassium, to escape from the surface of the glass substrate. In addition, when the removal depth becomes partially small due to microscopic unevenness or foreign matter, the possibility of ridge-like protrusions being formed in such portions would be much greater in comparison to the surrounding portions. This may result in a crash of a magnetic head, which serves as a device for reading information (magnetic data) from the surface of the glass substrate 18, and lower the reliability of a hard disk drive.

In the obtained texture 21, the ratio Rp/RMS between the maximum ridge height Rp, which is measured by an atomic force microscope (AFM), and the root mean square roughness RMS is preferably 15 or less and more preferably 5 or less. If the ratio Rp/RMS exceeds 15, the lifting height (HTO) of the magnetic head would become greater than 5 nm and hinder the lifting stability of the magnetic head. If the ratio Rp/RMS is 5 or less, the lifted height HTO would be 4 nm or less and thus be in a desirable state.

Further, it is preferred that the maximum height Ry of the texture 21 that is measured by the AFM be 10 nm or less. A state in which the maximum height Ry exceeds 10 nm is not desirable since the crystal orientation would be disturbed at deep portions of grooves when providing a magnetic layer on the surface of the glass substrate 18 after forming the texture. This would make it difficult for the magnetic head to read magnetic data signals.

Figure 5:
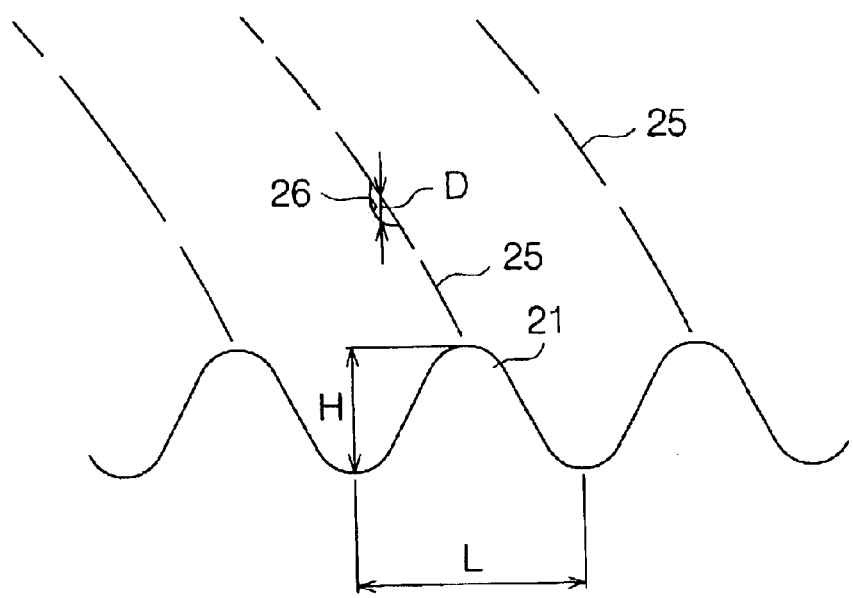
FIG. 5 is a schematic diagram illustrating the dimensions of part of the texture.

As shown in FIG. 5, the texture 21 is formed in an undulated manner. Ridges 25 extend in the circumferential direction, and recesses 26 are formed in the ridges 25. When the width L of a ridge 25 is 10 nm to 200 nm and its height H is 2 to 10 nm, it is preferred that the average depth D of the recess 26 be 2 nm or less and that the ratio H/D between the average recess depth D and the height H be 10 or greater. It is preferred that the average recess depth D be 0.5 nm or less. If the average depth D is greater than 2 nm and the ratio H/D is 10 or less, the lifting height HTO would be greater than 5 nm. This would hinder the lifting stability of the magnetic head. When the average depth D is 0.5 nm, the lifting height HTO is 4 nm or less and thus in a desirable state.

After texture formation, the acid treatment process 16 is performed with an acid solution. During the acid treatment, etching takes place and removes the abrasion material of the abrasion slurry and the glass chips produced during the texture formation from the surface of the glass substrate 18. The linear texture 21 extending in the circumferential direction of the glass substrate 18 is formed from fine embossments. Thus, the shape of the texture 21 may change when performing a physical or chemical process. Further, the width of the texture 21 is not uniform. Thus, the texture 21 may break, especially at portions where the texture 21 is narrow, and change the shape of the texture 21. However, in the above acid treatment process, such problems do not occur and the abrasion material and glass chips are sufficiently removed subsequent to the texture formation. In addition, ultrasonic wave emission or brush scrubbing may be performed to increase the removal effects.

Figure 4A:
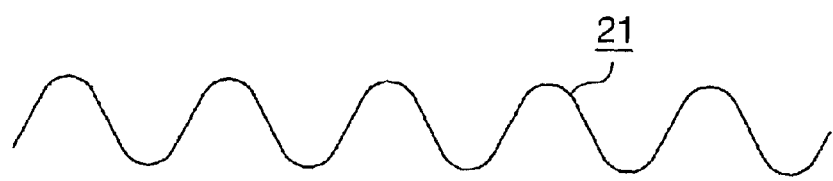
FIG. 4(*a*) is a schematic view showing the shape of the texture.
Figure 4B:
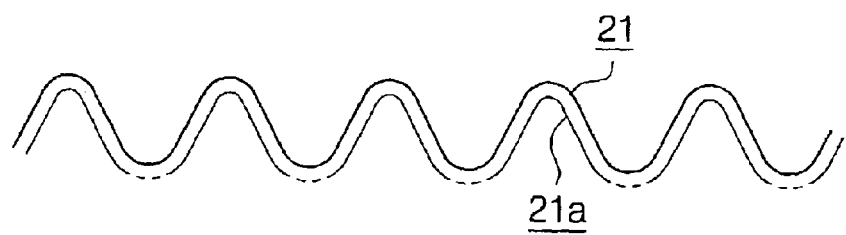

The texture 21 shown in FIG. 4(a), which was produced through the texture formation, is undulated and has a constant cycle and amplitude. FIG. 4(b) is a schematic view showing a texture 21a subsequent to the acid treatment. The acid treatment dissolves aluminum ions ($Al^{3+}$) and sodium ions ($Na^+$) from their silica bonding structure in the glass substrate 18. The broken line of FIG. 4(a) shows the resulting erosion that forms the texture 21a.

It is preferred that the acid solution be a solution selected from at least one of sulfuric acid, nitric acid, hydrochloric acid, sulfamic acid, acetic acid, tartaric acid, citric acid, gluconic acid, malonic acid, and oxalic acid. Sulfuric acid, nitric acid, hydrochloric acid, and sulfamic acid, which are strong acids, have high capabilities for dissolving steel foreign matter through etching. Acetic acid, tartaric acid, citric acid, gluconic acid, malonic acid, and oxalic acid have high capabilities for dissolving steel foreign matter and preventing re-deposition through etching and chelating.

The acid treatment may be classified in accordance with how the acid solution is fed to the glass substrate. That is, the acid treatment may be classified into a process in which the acid solution is rubbed onto the glass substrate with a belt-like rubbing member, a process in which the acid solution is scrubbed onto the glass plate with a scrubbing member, a process in which the acid solution is fed to the glass substrate while emitting ultrasonic waves toward the glass substrate, and a process in which the glass substrate is showered with the acid solution. It is preferred that at least one of these processes be performed.

Among these processes, the process that employs a rubbing member will now be discussed. In a state in which the acid solution is fed to the surface 20 of the glass substrate 18, the rubbing member is pressed against the surface 20 of the glass substrate 18 in the circumferential direction. In this case, a surface active agent, a chelating agent, or an organic solvent may be added. The acid treatment may be performed using the same apparatus as that used for the above texture formation. The following is an example of the conditions for performing acid treatment.

Tension of rubbing member: 8.8(N)
Moving speed of rubbing member: 7.6(cm/min)
Pressing force of roller: 8.8(N)
Rotating speed of glass substrate: 300(rpm)
Material of rubbing member: nylon
Feeding rate of acid solution: 20(ml/min)

The above acid treatment process 16 is performed before the alkali treatment process 17. Thus, foreign matter is efficiently removed and the etching amount of the glass substrate 18 is decreased. This is because metal oxides, such as cerium oxide, are electrified to negative in an alkali state and electrically repulsed from the glass substrate 18.

The process that employs a scrubbing member uses a sponge as the scrubbing member. In the process, scrubbing is performed along a direction that intersects the circumferential direction of the glass substrate 18 to efficiently remove the abrasion material and the glass chips. Further, when there is a protrusion that is much higher than the average height of the ridges, this would affect the lifting stability of the magnetic head in an undesirable manner when using the glass substrate as a magnetic recording medium. Such abnormal protrusion is formed in the circumferential direction during the texture formation. Thus, by scrubbing the glass substrate 18 in a direction intersecting the circumferential direction, the abrasion material and glass chips are removed efficiently.

The material of the sponge used for the scrubbing process is not restricted. However, a hard sponge having an Asker C hardness of 40 or greater is preferred since such a sponge would efficiently remove glass chips and abnormal protrusions. Asker C hardness complies with standard SRIS0101, which is regulated by the Society of Rubber Industry, Japan.

Scrubbing conditions, such as scrubbing pressure or the rotating speed of the glass substrate, are not restricted but determined in accordance with the surface state subsequent to the acid treatment.

In the process that employs ultrasonic waves, the conditions for ultrasonic wave processing are not restricted. However, to prevent changes in the texture shape, it is preferred that the frequency of the ultrasonic waves be 38 kHz or greater, the output be $1W/cm^2$ or less, the emission time be 2 to 20 minutes, and the temperature be 70° C. or less. The emission of the ultrasonic waves removes all of the foreign matter still adhered to the glass surface by a force.

In the process that showers the acid solution, the acid solution is sprayed in a shower-like manner in the circumferential direction of the glass substrate to prevent changes in the texture shape. The amount and pressure of the shower are determined in accordance with the residual foreign matter on the glass substrate surface.

The acid treatment process 16 is performed by carrying out one of the above processes or by carrying out two or more of the above processes. It is preferred that the processes be performed in the order of the process employing the rubbing member, the process employing the scrubbing member, the process employing ultrasonic waves, and the processing spraying the acid solution is a shower-like manner.

The alkali treatment process 17 performed after the acid treatment process 16 will now be discussed. This operation removes the foreign matter produced on the surface of the glass substrate 18 during the texture formation process 15, or the abrasion material of the diamond slurry 24. In the alkali treatment process, alkali decreases the water resistance of the silica bonding structures, which were not dissolved by the acid treatment, and facilitates removal.

Although inorganic alkali solution, such as ammonia water, or an organic alkali solution is used as the alkali solution, it is preferred that a solution of tetramethylammonium hydroxide be used. Although the tetramethylammonium hydroxide solution is strong alkali, its etching effect with respect to glass is weak.

The alkali treatment is performed in the same manner as acid treatment. The alkali treatment efficiently removes the fine foreign matter, which is collected on the surface 20 of the glass substrate 18, and the silica bonding structures, while preventing changes in the texture shape.

Subsequent to the alkali treatment, the glass substrate 18 is rinsed with pure water and then dried. To perform the rinsing, a process in which the glass substrate 18 is immersed in pure water, a process in which the glass substrate 18 is immersed in pure water while emitting ultrasonic waves, or a process for showering the glass substrate 18 with pure water may be carried out. To dry the glass substrate 18, a drying process using isopropyl alcohol (IPA) or spin drying may be performed.

When measured with anatomic force microscope (AFM), it is preferred that the texture 21 formed in the above manner has a minimum line width of 5 nm to 20 nm. The minimum line width refers to the width of the portion of the texture 21 that is narrowest. If the minimum line width is 5 nm or less, the shape of the texture 21 would tend to change easily when performing acid treatment or alkali treatment. When the minimum line width exceeds 20 nm, the number of textures in the radial direction of the glass substrate 18 would be reduced. This is not desirable since it would decrease the information recording density.

The glass substrate 18 that is used has a maximum depth of 0.5 to 10 nm, which indicates the acid resistance. The glass substrate 18 undergoes the disk machining process 11, the inner and outer circumferential surface chamfering process 12, the surface polishing process 13, the chemical reinforcement process 14, and the texture formation process 15. In the texture formation process 15, when diamond slurry 24 is dripped onto the surface 20 of the glass substrate 18, the tape 23 is pressed against the surface 20 of the glass substrate 18.

The acid treatment process 16 is performed after the texture formation process 15. During acid treatment, acid solution is fed to the surface of the glass substrate 18 and rubbed to the glass substrate 18 with a rubbing member. The etching effect of the acid treatment removes foreign matter, such as the residual abrasion material on the surface of the glass substrate 18 and the glass chips produced during the texture formation.

The alkali treatment process 17 is performed subsequent to the acid treatment process 16. The alkali treatment, which is performed in the same manner as acid treatment, removes fine foreign matter from the surface of the glass substrate 18 while suppressing changes in the texture shape. When the above processes are completed, the desired information recording medium glass substrate is obtained.

The preferred embodiment has the advantages described below.

In the preferred embodiment, the method for manufacturing an information recoding medium glass substrate uses the glass substrate 18, the maximum depth (acid resistance index) of which is 0.5 nm to 10 nm. Further, acid treatment is performed to etch the surface of the glass substrate 18 after forming the texture 21. This prevents components that have a low acid resistance, other than the silica bonding structures, from being excessively dissolved from the multiple component glass.

Accordingly, the etched amount is easily controlled during the acid treatment, and the foreign matter such as abrasion material and glass chips are sufficiently removed while preventing the shape of the texture 21 from being changed.

As a result, for example, when using the glass substrate 18 for a magnetic recording medium, the lifting stability of the magnetic head, which reads magnetic data from the surface of the glass substrate 18, is improved. This enables the lifting height to be lowered and increases the reading accuracy. Further, the magnetic head is prevented from being damaged.

By performing alkali treatment after the acid treatment, layers including a large amount of silica components may easily be removed. Further, the etching amount is controlled more accurately.

The acid treatment and alkali treatment are performed by carrying out at least one of the processes of rubbing the glass substrate 18 with a belt-like rubbing member, scrubbing the glass substrate 18 with a scrubbing member, emitting ultrasonic waves to the glass substrate 18, and showering the glass substrate with an acid solution or an alkali solution. This improves the efficiency for performing acid treatment or alkali treatment.

The acid solution is a solution selected from at least one of sulfuric acid, nitric acid, hydrochloric acid, sulfamic acid, acetic acid, tartaric acid, citric acid, gluconic acid, malonic acid, and oxalic acid. This enables the etching of at least the glass substrate. Further, among these acids, the chelate effect may be obtained by selecting an organic acid. Accordingly, the abrasion material and glass chips on the surface 20 of the glass substrate 18 are dissolved and prevented from being re-deposited on the surface 20.

The minimum line width of the texture 21 that is measured by an AFM is in the proper range of 5 nm to 20 nm. This effectively suppresses changes in the shape of the texture 21.

The preferred embodiment will now be discussed using an example and a comparative example.

EXAMPLE 1

An aluminosilicate glass ($SiO_2$, 65 percentage by weight; $Al_2O_3$, 16 percentage by weight; $Na_2O$, 9 percentage by weight; $Li_2O$, 4 percentage by weight; MgO, 2 percentage by weight; CaO, 4 percentage by weight) having a thickness of 0.6 mm, an outer diameter of 65 mm, and an inner diameter of 20 mm was used as the glass substrate 18. Further, the glass substrate 18 has an acid resistance index of 2.5 nm.

After chamfering the inner and outer circumferential surfaces of the glass substrate 18, lap polishing and smooth polishing were performed on the surface of the glass substrate 18. In the smooth polishing, the two surfaces of the glass substrate 18 was polished using a polishing agent containing cerium oxide and a polishing pad having an Asker C hardness of 70.

Afterward, the abrasive grains collected on the surface of the glass substrate 18 were removed by performing washing of the glass substrate 18 with polyvinyl alcohol and a sponge and by performing ultrasonic wave washing with a strong alkali solution. The glass substrate 18 was then rinsed with pure water. Subsequently, the glass substrate 18 was dried for one minute with isopropyl alcohol.

Then, chemical reinforcement was performed by immersing the glass substrate 18 in a mixed molten salt of potassium nitrate and sodium nitrate for 90 minutes to exchange the lithium and sodium ions of the glass substrate 18 with potassium ions, which have a greater ion radius. Afterward, the glass substrate 18 was immersed in hot water having a temperature of 65° C. for one hour to remove the molten salt.

Then, a texture machine (manufactured by Exclusive Design Company) was used to drip diamond slurry onto the glass substrate 18 while rotating the glass substrate 18. The texture machine performed texture formation on the surface of the glass substrate 18 under the following conditions.

Tension of tape 23: 22.1(N)
Moving speed of tape 23: 7.6(cm/min)
Pressing force of roller 22: 30.9(N)
Spindle rotating speed: 300(rpm)
Material of tape 23; polyester
Average grain diameter of diamond abrasion grains: 0.2 ($\mu$m)
Feeding rate of diamond slurry 24: 20(ml/min)

Subsequent to the texture formation, acid treatment was performed using a sulfuric acid solution. That is, the sulfuric acid solution was fed to the surface of the glass substrate 18 while rubbing the glass substrate 18 with the rubbing member. The alkali treatment was not performed.

The minimum texture width (nm) and the microscope luminance points (number per scope) were measured. The minimum texture width is the width of the portion where the texture is narrowest when analyzing a section having a width of 1 $\mu$m. The microscope luminance points refers to the number of luminance points that are counted when observing the glass substrate in a dark field with a microscope, the magnification of which is 200 times, in a state in which the glass substrate is illuminated by a halogen light source. The average of ten samples of the glass substrate was obtained.

The number of luminance points increases when there are recesses in the ridges of the texture 21 and when there is foreign matter on the texture 21.

The minimum texture width was 10 nm and the number of luminance points was 0.9 per scope.

EXAMPLE 2

An aluminosilicate glass ($SiO_2$, 63 percentage by weight; $Al_2O_3$, 16 percentage by weight; $Na_2O$, 11 percentage by weight; $Li_2O$, 4 percentage by weight; MgO, 2 percentage by weight; CaO, 4 percentage by weight) was used as the glass substrate 18. Further, the glass substrate 18 had an acid resistance index of 5.5 nm. The other conditions were the same as example 1 and the same operations as example 1 were performed. The minimum texture width of the obtained glass substrate was 10 nm and the number of luminance points was 0.6 per scope.

EXAMPLE 3

The glass substrate was immersed in a potassium hydroxide solution of 0.5 percentage by weight in the alkali treatment after the acid treatment. Otherwise, the same operations as example 2 were performed. The minimum texture width of the obtained glass substrate was 10 nm and the number of luminance points was 0.1 per scope.

COMPARATIVE EXAMPLE 1

A soda lime glass ($SiO_2$, 72.5 percentage by weight; $Al_2O_3$, 1.5 percentage by weight; $Na_2O$, 13 percentage by weight; MgO, 4 percentage by weight; CaO, 9 percentage by weight) was used as the glass substrate 18. Further, the glass substrate 18 had an acid resistance index of 0.2 nm. The other conditions were the same as example 1 and the same operations as example 1 were performed. The minimum texture width of the obtained glass substrate was 10 nm and the number of luminance points was 6.1 per scope.

COMPARATIVE EXAMPLE 2

An aluminosilicate glass ($SiO_2$, 61.5 percentage by weight; $Al_2O_3$, 17.5 percentage by weight; $Na_2O$, 11 percentage by weight; $Li_2O$, 4 percentage by weight; MgO, 2 percentage by weight; CaO, 4 percentage by weight) was used as the glass substrate 18. Further, the glass substrate 18 had an acid resistance index of 12.0 nm. The other conditions were the same as example 1 and the same operations as example 1 were performed. The minimum texture width of the obtained glass substrate was 10 nm and the number of luminance points was 15.9 per scope. A luminance point indicates a portion where the texture is broken. In this case, the number of luminance points was abnormally large.

It should be apparent to those skilled in the art that the present invention may be embodied in many other specific forms without departing from the spirit or scope of the invention. Particularly, it should be understood that the present invention may be embodied in the following forms.

A reducing agent, such as hydrogen peroxide and ascorbic acid, may be included in the acid solution. This enhances the decomposition of metal oxides, such as cerium oxide, in a state in which etching of the glass substrate 18 is minimized. Further, this easily removes foreign matter, such as abrasion material and glass chips.

Sulfuric acid and tartaric acid may be mixed and used as the acid of the acid solution. This stabilizes the foreign matter on the surface of the glass substrate 18 as iron and facilitates removal.

The acid treatment or the alkali treatment may be performed by just immersing the glass substrate 18 in the acid solution or the alkali solution. Further, the acid or alkali solution may be heated to improve the processing efficiency and shorten the processing time.

A washing operation may be performed with a neutral solution after performing the surface polishing process 13, the chemical reinforcement process 14, the texture formation process 15, the acid treatment process 16, and the alkali treatment process 17. Pure water is mainly used in the neutral solution washing operation. However, an organic solvent, a surface active agent, and a chelating agent may be added to the neutral solution.

The present examples and embodiments are to be considered as illustrative and not restrictive, and the invention is not to be limited to the details given herein, but may be modified within the scope and equivalence of the appended claims.

What is claimed is:

1. A method for manufacturing a glass substrate that is used as an information recording medium, the method comprising the steps of:

preparing a glass substrate, wherein the glass substrate has acid resistance of 0.5 nm to 10 nm, the acid resistance being measured by the maximum depth at which components other than silica dissolve from the glass substrate during immersion of the glass substrate in 1 percentage of weight of sulfuric acid at 50° C. for one minute, forming a linear texture by pressing a tape against the glass substrate in a circumferential direction of the glass substrate while rotating the glass substrate and feeding abrasion slurry to the surface of the glass substrate; and performing an acid treatment on the glass substrate on which the texture is formed.

2. The method according to claim 1, further comprising the step of:

performing an alkali treatment on the glass substrate with an alkali solution subsequent to the acid treatment.

3. The method according to claim 1, wherein the acid treatment is performed by carrying out at least one of a process in which the acid solution is rubbed onto the glass substrate, a process in which the acid solution is fed to the glass substrate while emitting ultrasonic waves, and a process in which the acid solution is sprayed onto the glass substrate.

4. The method according to claim 2, wherein the alkali treatment is performed by carrying out at least one of a process in which the acid solution is rubbed onto the glass substrate, a process in which the acid solution is fed to the glass substrate while emitting ultrasonic waves, and a process in which the acid solution is sprayed onto the glass substrate.

5. The method according to claim 1, wherein the acid solution is at least one selected from sulfuric acid, nitric acid, hydrochloric acid, sulfamic acid, acetic acid, tartaric acid, citric acid, gluconic acid, malonic acid, and oxalic acid.

6. The method according to claim 1, wherein the minimum line width of the texture is 5 nm to 20 nm.

7. The method according to claim 1, further comprising the step of:

chemically reinforcing the glass substrate by immersing the glass substrate in a molten liquid of a chemical reinforcement salt before or after the texture formation and exchanging some of the ions of the glass substrate with ions having a greater diameter.

8. The method according to claim 1, wherein the surface of the glass substrate has a surface roughness Ra of 0.1 nm to 1.5 nm subsequent to the texture formation.

* * * * *